(12) United States Patent
Yuan

(10) Patent No.: US 8,805,322 B2
(45) Date of Patent: Aug. 12, 2014

(54) METHOD, APPARATUS, AND MOBILE PHONE FOR MEASURING AND DISPLAYING INTERNET TRAFFIC OF MOBILE PHONE

(75) Inventors: Zhiquan Yuan, Shenzhen (CN); Yajun Zhang, legal representative, Beijing (CN)

(73) Assignee: Huawei Device Co., Ltd., Shenzhen (CN)

(*) Notice: Subject to any disclaimer, the term of this patent is extended or adjusted under 35 U.S.C. 154(b) by 63 days.

(21) Appl. No.: 13/457,214

(22) Filed: Apr. 26, 2012

(65) Prior Publication Data

US 2012/0214439 A1   Aug. 23, 2012

Related U.S. Application Data

(63) Continuation of application No. PCT/CN2010/079980, filed on Dec. 20, 2010.

(30) Foreign Application Priority Data

Jan. 12, 2010  (CN) .......................... 2010 1 0000578

(51) Int. Cl.
*H04M 11/00* (2006.01)
(52) U.S. Cl.
USPC .......................... 455/405; 455/558; 455/414.2
(58) Field of Classification Search
CPC ................... H04M 2215/204; H04M 2215/32; H04W 4/24; H04W 4/26; H04B 1/3816
USPC .................... 455/405–408, 414.1–414.2, 558
See application file for complete search history.

(56) References Cited

U.S. PATENT DOCUMENTS

| | | | |
|---|---|---|---|
| 2002/0091599 | A1 | 7/2002 | Masuda et al. |
| 2007/0117551 | A1* | 5/2007 | Boris et al. .................. 455/414.1 |
| 2008/0045179 | A1* | 2/2008 | Bekanich et al. ............. 455/405 |
| 2008/0261603 | A1* | 10/2008 | Sever et al. .................... 455/445 |
| 2010/0048169 | A1* | 2/2010 | Yan et al. ....................... 455/411 |

FOREIGN PATENT DOCUMENTS

| | | |
|---|---|---|
| CN | 1464732 A | 12/2003 |
| CN | 1885889 A | 12/2006 |
| CN | 101146300 A | 3/2008 |
| CN | 101183950 A | 5/2008 |
| CN | 101459523 A | 6/2009 |
| CN | 101600186 A | 12/2009 |
| CN | 101800792 A | 8/2010 |
| JP | 2002209030 A | 7/2002 |

(Continued)

OTHER PUBLICATIONS

Extended European Search Report issued in corresponding European Patent Application No. 10842908.5, mailed Sep. 12, 2012.

(Continued)

*Primary Examiner* — Marcos Torres
(74) *Attorney, Agent, or Firm* — Brinks Gilson & Lione

(57) ABSTRACT

An apparatus for measuring and displaying Internet traffic of a mobile phone, includes a traffic measurement module and a traffic display module. The apparatus also includes a SIM card account creation module configured to create a SIM card account for each of a plurality of SIM cards. The traffic measurement module measures the Internet traffic of each of the SIM card accounts. The traffic display module displays the Internet traffic of each of the SIM card accounts. The Internet traffic of each SIM card on the mobile phone may be measured and displayed.

6 Claims, 3 Drawing Sheets

(56) References Cited

FOREIGN PATENT DOCUMENTS

| JP | 2005184538 A | 7/2005 |
|---|---|---|
| JP | 2007221274 A | 8/2007 |
| WO | WO 92/19078 A1 | 10/1992 |

OTHER PUBLICATIONS

Office Action issued in corresponding Chinese Patent Application No. 201010000578.9; mailed Sep. 5, 2011.
Written Opinion of the International Searching Authority issued in corresponding PCT Application No. PCT/CN2010/076132; mailed Nov. 25, 2010.
Search Report issued in corresponding PCT Application No. PCT/CN2010/079980; mailed Mar. 31, 2011.
Office Action issued in corresponding Chinese Patent Application No. 201010000578.9, mailed Jul. 23, 2012.
Office Action issued in corresponding Chinese Patent Application No. 201010000578.9, mailed Oct. 24, 2012.
Office Action issued in corresponding Korean Patent Application No. 10-2012-7005952, mailed Aug. 5, 2013, 5 pages.
Office Action issued in corresponding Japanese Application No. 2012-530120, mailed Jul. 2, 2013, 4 pages.

* cited by examiner

METHOD, APPARATUS, AND MOBILE PHONE FOR MEASURING AND DISPLAYING INTERNET TRAFFIC OF MOBILE PHONE

CROSS-REFERENCE TO RELATED APPLICATIONS

This application is a continuation of International Application No. PCT/CN 2010/079980, filed on Dec. 20, 2010, which claims priority to Chinese Patent Application No. 201010000578.9, filed on Jan. 12, 2010, both of which are incorporated herein by reference in their entireties.

FIELD OF THE APPLICATION

The present application relates to the field of mobile phone terminal technologies, and in particular, to a method, an apparatus, and a mobile phone for measuring and displaying Internet traffic of a mobile phone.

BACKGROUND OF THE APPLICATION

With the development of 3G technologies, it is increasingly popular to surf the Internet by using a mobile phone. A user hopes to query Internet traffic. For example, the user subscribes to a monthly Internet-surfing package service and may enjoy a total of 1000 MB Internet traffic. A charge for excess of the traffic is high. Therefore, the user hopes to know current Internet traffic to control subsequent Internet traffic so as to save an expense. Currently, the user may query the Internet traffic by logging in to a Web site of an operator such as China Mobile or China Unicom and entering keywords such as a mobile phone number and personal information, or dial a customer service number or send a short message to know the Internet traffic. However, these methods are all cumbersome, and in order to simplify the operational process of the user, some mobile phones integrate a function of querying the Internet traffic. Specifically, an Internet traffic measuring module is disposed in a mobile phone, and the module implements a function of Internet traffic measurement by counting the Internet traffic. The user does not need to perform querying to the operator, and may view a using condition of the Internet traffic simply by using the user's own mobile phone, which is very convenient. However, during the research, the inventor discovers that the Internet traffic measurement function on a mobile phone at present performs the measurement only for the mobile phone at present, but currently more and more users use two or more SIM cards on one mobile phone, for example, one SIM card is used in office hours, and another SIM card is used at home, or for a dual-mode or multimode mobile phone, multiple SIM cards may be supported simultaneously. In this case, the original Internet traffic measurement based on the mobile phone cannot meet a requirement.

SUMMARY OF THE APPLICATION

The described embodiments provide a method, an apparatus, and a mobile phone for measuring and displaying Internet traffic of a mobile phone so that the Internet traffic of the mobile phone can be measured and displayed based on SIM cards respectively.

For the foregoing purpose, the embodiments adopt the following technical solutions:

An apparatus for measuring and displaying Internet traffic of a mobile phone includes a traffic measuring module, a traffic displaying module, and a SIM card account creating module, where:

the SIM card account creating module is configured to create a SIM card account for each SIM card respectively;

the traffic measuring module is configured to measure Internet traffic of each SIM card account respectively; and the traffic displaying module is configured to display the Internet traffic of each SIM card account respectively.

A mobile phone for measuring and displaying Internet traffic according to SIM cards includes a traffic measuring module, a traffic displaying module, and a SIM card account creating module, where:

the SIM card account creating module is configured to create a SIM card account for each SIM card respectively;

the traffic measuring module is configured to measure Internet traffic of each SIM card account respectively; and the traffic displaying module is configured to display the Internet traffic of each SIM card account respectively.

A method for measuring and displaying Internet traffic of a mobile phone includes:

creating a SIM card account for each SIM card respectively;

when there is an Internet data stream, determining a SIM card account corresponding to the data stream, and writing Internet traffic of the data stream into the corresponding SIM card account; and displaying the Internet traffic according to the SIM card account.

Therefore, in the embodiments, the Internet traffic of each SIM card may be measured and displayed respectively, thereby meeting a requirement of a user.

DETAILED DESCRIPTION OF THE EMBODIMENTS

In view of a situation where one mobile phone has multiple SIM cards, in the embodiments, Internet traffic of each SIM card is measured respectively to meet a requirement of a user for performing traffic measurement for each SIM card, thereby better meeting the requirement of the user.

Figure 1:
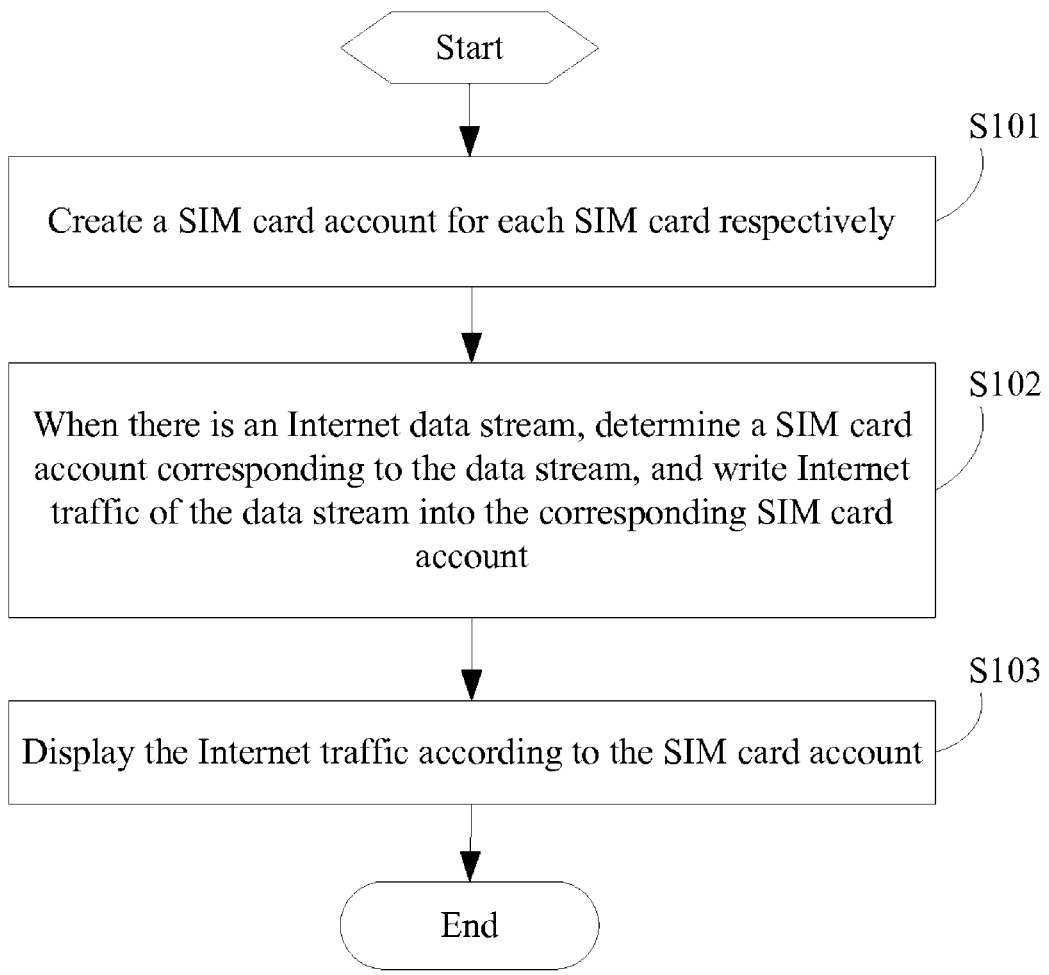
FIG. 1 is a flowchart of a method for measuring and displaying Internet traffic of a mobile phone according to an embodiment.

FIG. 1 is a flowchart of a method for measuring and displaying Internet traffic of a mobile phone according to an embodiment. The method includes the following steps:

S101: Create a SIM card account for each SIM card respectively.

S102: When there is an Internet data stream, determine a SIM card account corresponding to the data stream, and write Internet traffic of the data stream into the corresponding SIM card account.

S103: Display the Internet traffic according to the SIM card account.

Where, S101 includes:

S101a: Extract from each SIM card a unique identity of the SIM card.

S101b: Create a SIM card account corresponding to the unique identity of the SIM card.

The embodiments are described in detail below from each of the stages: creating a SIM card account, measuring Internet traffic, and displaying the Internet traffic.

Figure 2:
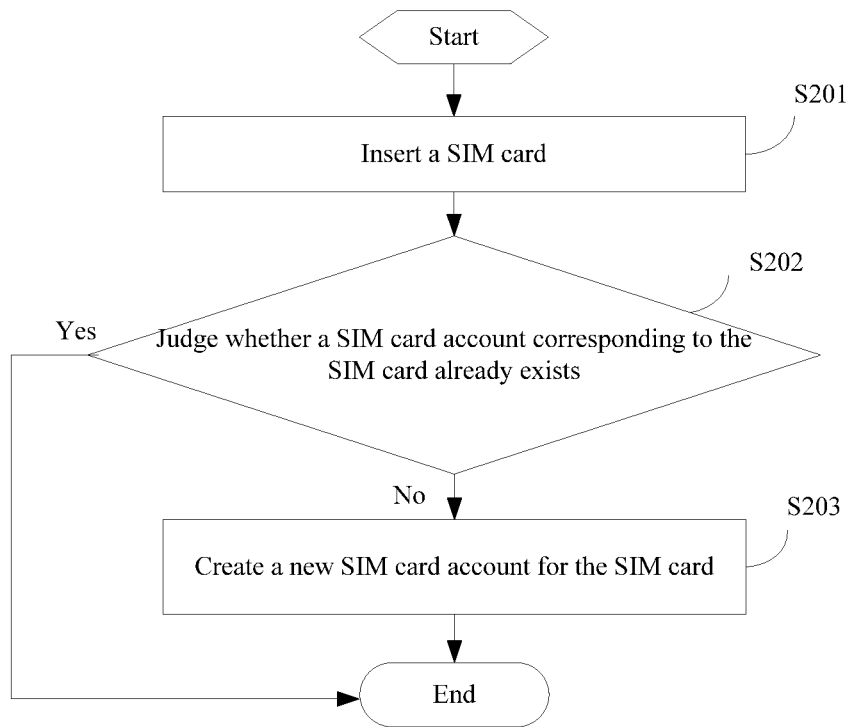
FIG. 2 is a flowchart of creating a SIM card account according to another embodiment.

FIG. 2 is a flowchart of creating a SIM card account according to another embodiment, that illustrates the following operations:

S201: Insert a SIM card.

S202: Judge whether a SIM card account corresponding to the SIM card already exists or not. If the SIM card account corresponding to the SIM card already exists, perform S203; or else, the process ends.

S203: Create a new SIM card account for the SIM card. Then, the process ends.

After a mobile phone is powered on, a background program first judges whether there is an account or not according to the SIM card and an Internet data stream on the mobile phone. If there is an account, the process of creating a SIM card account is skipped. Otherwise, a new SIM card account is created in a database.

Figure 3:
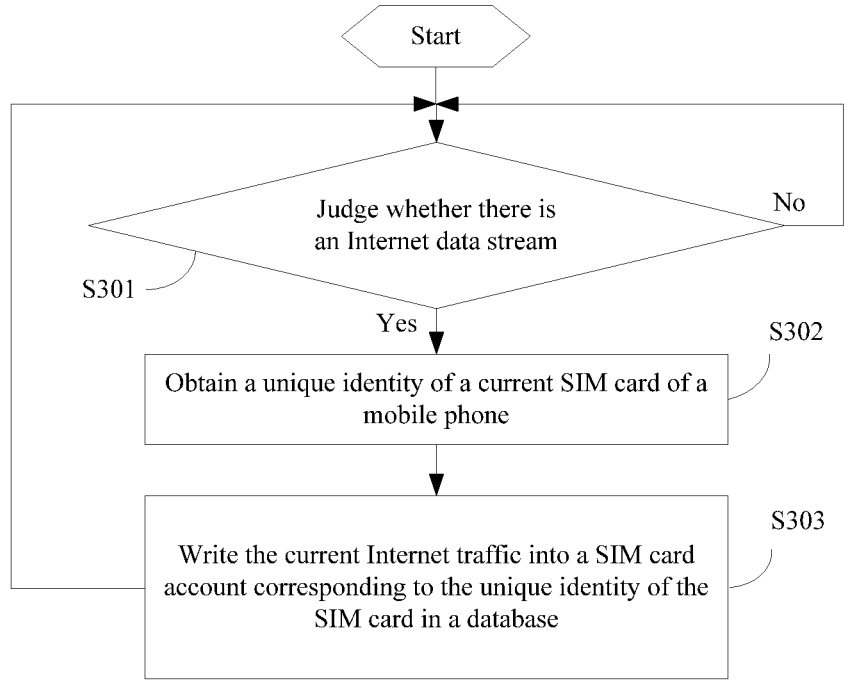
FIG. 3 is a flowchart of measuring traffic according to another embodiment.

FIG. 3 is a flowchart for measuring traffic according to another embodiment, including:

S301: Judge whether there is an Internet data stream or not. If there is an Internet data stream, perform S302; or else, keep performing S301.

S302: Obtain a unique identity of a current SIM card of a mobile phone (such as a SIM card number or part of fields of the SIM card number or a coding result of the SIM card number).

S303: Write current Internet traffic into a SIM card account corresponding to the unique identity of the SIM card in a database, and then continue to perform S301.

A background application keeps monitoring whether there is an Internet data stream or not. If there is no Internet data stream, the background application waits. If there is an Internet data stream, the current SIM card account is first obtained and then the Internet traffic is written into the corresponding SIM card account.

Figure 4:
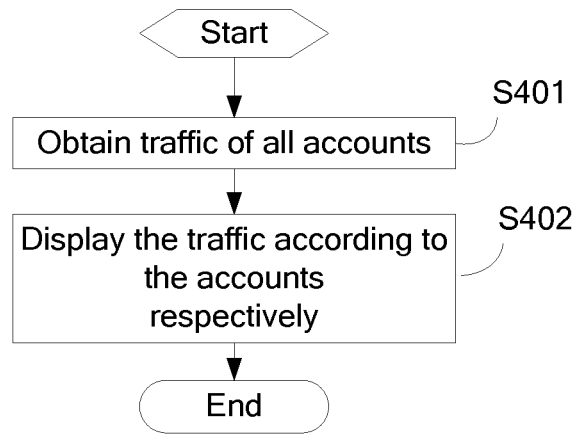
FIG. 4 is a flowchart of displaying traffic according to another embodiment.

FIG. 4 is a flowchart of displaying traffic according to another embodiment, including:

S401: Obtain traffic of all accounts.

S402: Display the traffic according to accounts respectively.

An embodiment further provides an apparatus for measuring and displaying Internet traffic of a mobile phone. The apparatus may be implemented through software, hardware, or a combination of software and hardware. Specifically, the apparatus is disposed in a mobile phone for a user to query the Internet traffic of each SIM card.

Figure 5:
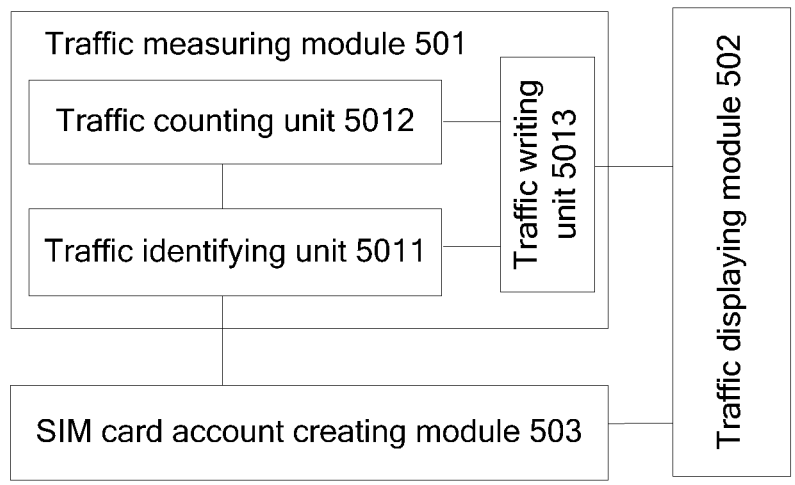
FIG. 5 is a schematic diagram of an apparatus for measuring and displaying Internet traffic of a mobile phone according to an embodiment.

FIG. 5 shows an apparatus for measuring and displaying Internet traffic of a mobile phone according to an embodiment. The apparatus includes a traffic measuring module 501, a traffic displaying module 502, and a SIM card account creating module 503, where:

the SIM card account creating module 503 is configured to create a SIM card account for each SIM card respectively; and the traffic measuring module 501 measures the Internet traffic of each SIM card account respectively, and the traffic displaying module 502 displays the Internet traffic of each SIM card account respectively.

The traffic measuring module 501 includes:

a traffic identifying unit 5011, configured to identify a SIM card account corresponding to the current Internet traffic;

a traffic counting unit 5012, configured to count the traffic; and a traffic writing unit 5013, configured to write the Internet traffic counted by the traffic counting unit 5012 into the corresponding SIM card account.

The SIM card account creating module 503 includes: an extracting submodule, configured to extract from each SIM card a unique identity of the SIM card; and a creating submodule, configured to create a SIM card account corresponding to the unique identity of the SIM card.

The Internet traffic displayed by the traffic-displaying module 502 is displayed in MB or by Internet-surfing time.

It should be noted that there are mature codes or hardware in an existing scheme for implementing the traffic measuring module and the traffic-displaying module. Therefore, the prior art may be applied directly in this embodiment.

In addition, an embodiment further provides a mobile phone for measuring and displaying Internet traffic according to SIM cards, and through the mobile phone, a user may query the Internet traffic of each SIM card.

The mobile phone includes at least the following modules:

a SIM card account creating module, configured to create a SIM card account for each SIM card respectively;

a traffic measuring module, configured to measure Internet traffic of each SIM card account respectively; and a traffic displaying module, configured to display the Internet traffic of each SIM card account respectively.

The traffic measuring module includes:

a traffic identifying unit, configured to identify a SIM card account corresponding to the current Internet traffic;

a traffic counting unit, configured to count the traffic; and a traffic writing unit, configured to write the Internet traffic measured by the traffic counting unit into the corresponding SIM card account.

The SIM card account creating module includes: an extracting submodule, configured to extract from each SIM card a unique identity of the SIM card; and a creating submodule, configured to create a SIM card account corresponding to the unique identity of the SIM card.

The Internet traffic displayed by the traffic displaying module is displayed in MB or by Internet-surfing time.

Therefore, in the embodiments, the Internet traffic of each SIM card can be measured and displayed respectively, thereby meeting the requirement of the user, where at the time of displaying the traffic, duration may be displayed to the user, for example, Internet-surfing time is displayed, or the amount of used data resources is displayed to the user, for example, that how many megabytes (M) of data resources have been used is displayed.

Using an actual example for description, it is assumed that a user uses two SIM cards, that is, SIM 1 and SIM 2, on a mobile phone. Monthly Internet-surfing package services subscribed by the two cards are different, that is, the service subscribed by SIM 1 is 100 minutes of free Internet-surfing time and a high charge for excess of 100 minutes, while the service subscribed by SIM 2 is 1000 MB free traffic and a high charge for excess of 1000 MB Internet traffic. According to the embodiments, the Internet traffic may be measured and displayed for SIM 1 and SIM 2 respectively so that the user can view a current Internet-surfing condition of each SIM card in an intuitive manner. For example, the user knows through a query that the Internet-surfing time that has been used currently by SIM 1 in a current month is 90 minutes, and that the traffic that has been currently used by SIM 2 in the current month is 300 MB. Therefore, the user may properly reduce the use of SIM 1 for surfing the Internet and properly increase the use of SIM 2 for surfing the Internet during the subsequent time of the current month, so as to achieve an object of saving an expense.

Those of ordinary skill in the art may understand that the processes of the methods of the foregoing embodiments may be completed by relevant hardware instructed by a program. The program may be stored in a readable storage medium. When the program is executed, the corresponding steps in the foregoing methods are performed. The storage medium may be an ROM/RAM, a magnetic disk, a CD-ROM, and so on.

The foregoing describes only exemplary embodiments. It should be understood that those of ordinary skill in the art might modify or improve upon the embodiments. Any such modifications and improvements shall be deemed to fall within the protection scope of the claims.

What is claimed is:

1. A method for measuring and displaying Internet traffic of a mobile phone which has a plurality of SIM cards, comprising:
    the mobile phone creating a SIM card account for each of the plurality of SIM cards;
    the mobile phone monitoring whether the mobile phone is having an Internet data stream currently;
    if the mobile phone is having an Internet data stream currently, the mobile phone measuring the Internet traffic of the Internet data stream and determining which SIM card is being used currently;
    the mobile phone storing the measured Internet traffic of the Internet data stream into the SIM card account for the SIM card being used currently; and
    the mobile phone displaying all the measured Internet traffic according to the SIM card accounts respectively.

2. The method according to claim 1, wherein the mobile phone creating a SIM card account for each of the plurality of SIM cards comprises:
    the mobile phone extracting a unique identity of each SIM card; and
    creating the SIM card account corresponding to the unique identity of the SIM card.

3. The method according to claim 1, wherein the Internet traffic comprises at least one of the following: data resource amount or Internet-surfing duration.

4. A mobile phone having a plurality of SIM cards, comprising:
    a transceiver, configured to receive and send data;
    a processor, configured to:
        create a SIM card account for each of the plurality of SIM cards;
        monitor whether the transceiver is receiving an Internet data stream currently;
        if the transceiver is receiving an Internet data stream currently, measure the Internet traffic of the Internet data stream and determine which SIM card is being used currently; and
        store the measured Internet traffic of the Internet data stream into the SIM card account for the SIM card being used currently;
    wherein the mobile phone further comprises a display which is configured to display all the measured Internet traffic according to the SIM card accounts respectively.

5. The mobile phone according to claim 4, wherein the processor is specifically configured to: extract a unique identity of each SIM card and create the SIM card account corresponding to the unique identity of the SIM card.

6. The mobile phone according to claim 4, wherein the Internet traffic comprises at least one of the following: data resource amount or Internet-surfing duration.

* * * * *